United States Patent
Park

(10) Patent No.: US 11,679,530 B2
(45) Date of Patent: Jun. 20, 2023

(54) MANUFACTURING METHOD OF HOT FORMING MOLD FOR CENTER PILLAR TRIM INCLUDING COOLING UNIT

(71) Applicant: TNP corporation, Chungju-si (KR)

(72) Inventor: Sang Gill Park, Chungju-si (KR)

(73) Assignee: TNP corporation, Chungju-si (KR)

( * ) Notice: Subject to any disclaimer, the term of this patent is extended or adjusted under 35 U.S.C. 154(b) by 219 days.

(21) Appl. No.: 17/208,143

(22) Filed: Mar. 22, 2021

(65) Prior Publication Data
US 2021/0291411 A1    Sep. 23, 2021

(30) Foreign Application Priority Data
Mar. 23, 2020  (KR) .......................... 10-2020-0035203

(51) Int. Cl.
  *B23K 20/02*  (2006.01)
  *B29C 33/38*  (2006.01)

(52) U.S. Cl.
  CPC .......... *B29C 33/3842* (2013.01); *B23K 20/02* (2013.01); *B29K 2905/00* (2013.01)

(58) Field of Classification Search
  None
  See application file for complete search history.

(56) References Cited

FOREIGN PATENT DOCUMENTS

| JP | 2643354 B2 | * | 8/1997 |
| JP | 2643354 B2 | | 8/1997 |
| JP | 2010194720 A | * | 9/2010 |
| KR | 20130063894 A | * | 6/2013 |
| KR | 1020130063894 A | | 6/2013 |
| KR | 101283983 B1 | | 7/2013 |
| KR | 101403668 B1 | | 6/2014 |

OTHER PUBLICATIONS

Office Action of KR 10-2020-0035203 Application dated Jul. 3, 2020.

* cited by examiner

Primary Examiner — Devang R Patel
(74) *Attorney, Agent, or Firm* — Dinsmore & Shohl LLP; Yongsok Choi, Esq.

(57) ABSTRACT

A manufacturing method of a hot forming mold of a center pillar including a cooling unit is provided. The method includes a step of preparing a material by dividing the material, a cooling channel processing step of processing cooling channels on a front surface and a rear surface within a contour line by center pillar design information input in advance to an NC processor and cooling channel design information, a solid phase diffusion bonding step, a mold material processing step of processing along the contour line by the center pillar design information input in advance through the NC processor to manufacture a mold material, and a thermal processing step of heating the mold material at a predetermined temperature.

8 Claims, 18 Drawing Sheets

S300

S300

S400

<LOW TEMPERATURE STATE>

<HIGH TEMPERATURE STATE>

MANUFACTURING METHOD OF HOT FORMING MOLD FOR CENTER PILLAR TRIM INCLUDING COOLING UNIT

CROSS-REFERENCE TO RELATED APPLICATIONS

This application claims the priority of Korean Patent Application No. 10-2020-0035203 filed on Mar. 23, 2020, in the Korean Intellectual Property Office, the disclosure of which is incorporated herein by reference.

BACKGROUND

Field

The present disclosure relates to a manufacturing method of a hot forming mold for a center pillar trim, and more particularly, to a manufacturing method of a hot forming mold including a cooling unit.

Description of the Related Art

Generally, a hot forming mold needs to include a cooling channel therein along a shape of an edge of a forming surface of the mold to maintain a shape thereof by cooling heat of a product to be formed and the cooling channel needs to be formed with a predetermined depth on the edge along the shape of the forming surface so as not to cause a cooling difference in individual parts of the mold.

For example, according to a hot stamping method of rapidly cooling a formed product after forming the material by heating the material at a temperature of 600° C., more specifically, at a temperature of 900° C. or higher, the formed product is change to be rigid with a high solidity. Therefore, a hot forming mold used therefor includes a cooling channel therein along a shape edge at a height of the forming surface. However, when the hot forming mold which requires such a cooling system is manufactured, according to the related art, a manufacturing method which processes a cooling channel as a straight line with a gun drill to connect the channel is mainly employed.

However, according to the straight processing method of the cooling channel using the gun drill, there is a problem in that it is difficult to form the cooling channel with a constant depth along the edge of the forming surface, so that it is difficult to obtain a uniform quality of the forming product. That is, according to the gun drill processing method, some cooling channel is processed to be close to the edge of the forming surface and the other cooling channel is processed to be away from the edge so that the depth of the cooling channel is not uniform, which may cause the variance of the cooling efficiency for every part. As described above, when the cooling efficiency varies, it takes longer time to cool so that a product productivity is lowered and deformation of the formed product easily occurs, which may degrade the uniformity of the quality.

In order to solve the above problems, a related art is disclosed in Korean Registered Patent No. 10-1283983 (Jul. 9, 2013) entitled "Mold for hot stamping" (hereinafter, referred to as Related Art 1). According to Related Art 1, a mold for hot stamping is configured to include a plurality of mold plates which is sequentially overlaid to form a cavity surface, a plate cooling hole which is formed to be dented on at least one overlaid surface of each mold plate, and a base which includes a base cooling passage which is vertically coupled to the plurality of mold plates and communicates with each plate cooling groove, in which an outline in a direction opposite to a direction where the base is coupled forms a part of the cavity surface in the mold plate. That is, according to Related Art 1, a mold material is cut into a plurality of mold materials and an appropriate forming surface according to each assembling position is individually processed first to create a plurality of mold plates and the mold plates are overlaid and then fastened by a fastening member to form a sub assembly. However, Related Art 1 has the following problems.

First, it is necessary to precisely process a forming surface so as to precisely match shapes or heights of individually processed forming surfaces of each mold plate material when the surfaces are overlaid so that it takes a lot of time to manufacture a mold. Second, the plurality of mold plates in which the forming surfaces are processed in advance needs to thoroughly process both overlaid surfaces with a high precision to ensure the water tightness at the time of being overlaid so that the productivity of the mold production is degraded. Third, as a pressurizing unit for ensuring a water tightness between mold plates, the mold plates are tightened with a fastening member of a long bolt. However, a punch and die configured by such mold plates repeatedly receive significant impact pressure during the product forming so that it is difficult to maintain the water tightness, which results in degradation of durability such as the water leakage soon.

As another related art, there is "press mold manufacturing method for production of hot stamping cooling trim (hereinafter, referred to as Related Art 2) of Korean Registered Patent No. 10-1403668 (Jun. 20, 2014) which is prior art by the present applicant. Related Art 2 is configured by a first step of forming a single body mold material by performing diffusion-bonding on different types of steel bodies which are ultra-high hardness steel and hot alloy tool steel, a second step of polishing a bottom surface and one edge surface of the mold material with a processing margin in consideration of a deformation at the time of thermal processing, a third step of processing the remaining edge surfaces of the mold material, a fourth step of processing a reference hole and a reference surface, a fifth step of forming a plurality of bolt holes, a sixth step of three-dimensionally processing one surface with respect to the reference hole, a seventh step of thermally processing the mold material, and an eighth step of polishing a bottom surface and one edge surface with a regular dimension and wiring the edge surfaces with the regular dimension by applying a corrected value based on a numerical value table of a measurement value according to the processing condition to enable mass processing of 150 kg of steel products at a lower price, which reduces the mold development costs and improves the durability.

However, according to the method of Related Art 2 which penetrates a hole in the mold material after bonding different types of steel bodies as one mold material first, it is difficult to form a plurality of cooling channels with a regular distance along an edge shape of the forming surface with a regular depth so that it is not appropriate to manufacture a hot forming mold which needs to include a plurality of cooling channels therein.

RELATED ART DOCUMENT

Patent Document (Patent Document 1) Korean Registered Patent No. 10-1283983 (Jul. 9, 2013)

(Patent Document 2) Korean Registered Patent No. 10-1403668 (Jun. 20, 2014)

SUMMARY

Therefore, the present disclosure is developed to improve the problems of the related art and the prior art and an object of the present disclosure is to provide a manufacturing method of a hot forming mold of a center pillar including a cooling unit which easily forms a plurality of cooling channels along a shape of the edge at a regular depth and with a regular distance when the hot forming mold is manufactured so that a cooling efficiency and a forming quality are increased and there is no warry about the water leakage, and a manufacturing man hour is minimized by omitting a sealing task to reduce a cost and increase a productivity.

Another object of the present disclosure is to provide a manufacturing method of a hot forming mold of a center pillar including a cooling unit which is easily designed to process cooling channels provided in a plurality of rows in the mold to have all necessary shapes such as curved line or vertical line as well as a straight line and adjust a cooling speed by adjusting a thickness of a divided material to be solid-phase diffusion bonded.

According to an aspect of the present disclosure, a manufacturing method of a hot forming mold of a center pillar including a cooling unit includes: a step of preparing a material by cutting a metal material to have a predetermined thickness to be divided into a plurality of divided materials, a cooling channel processing step of processing cooling channels on a front surface and a rear surface within a contour line by center pillar design information input in advance to an NC processor and cooling channel design information, on a surface on which the plurality of divided materials is overlaid, a solid phase diffusion bonding step of performing solid phase diffusion bonding after sequentially locating the plurality of divided materials such that cooling channels abut to form an integrated material, a mold material processing step of processing the integrated material along the contour line by the center pillar design information input in advance through the NC processor to manufacture a mold material, and a thermal processing step of heating the mold material at a predetermined temperature.

According to the present disclosure, a mold is manufactured using solid phase diffusion bonding which allows a plurality of sheets of divided materials to have the same physical property as a base material and cooling channels in a plurality of columns are conveniently and precisely formed in the mold along an edge of a forming surface with a predetermined depth and interval so that a size of the mold may be minimized and a cost may be reduced. Further, water tightness between a plurality of cooling channels provided therein is excellent so that there is no worry about water leakage and a cooling efficiency may be increased, thereby improving a quality of a formed product.

Further, after precisely processing the cooling channel in each divided material, the solid phase diffusion bonding is performed and then a forming surface at an outer circumference is processed so that all necessary processing of the cooling channel, such as straight line, curved line, or vertical processing is possible and a mold which may control the cooling speed for every part by adjusting the thickness of the plurality of divided materials can be easily manufactured.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
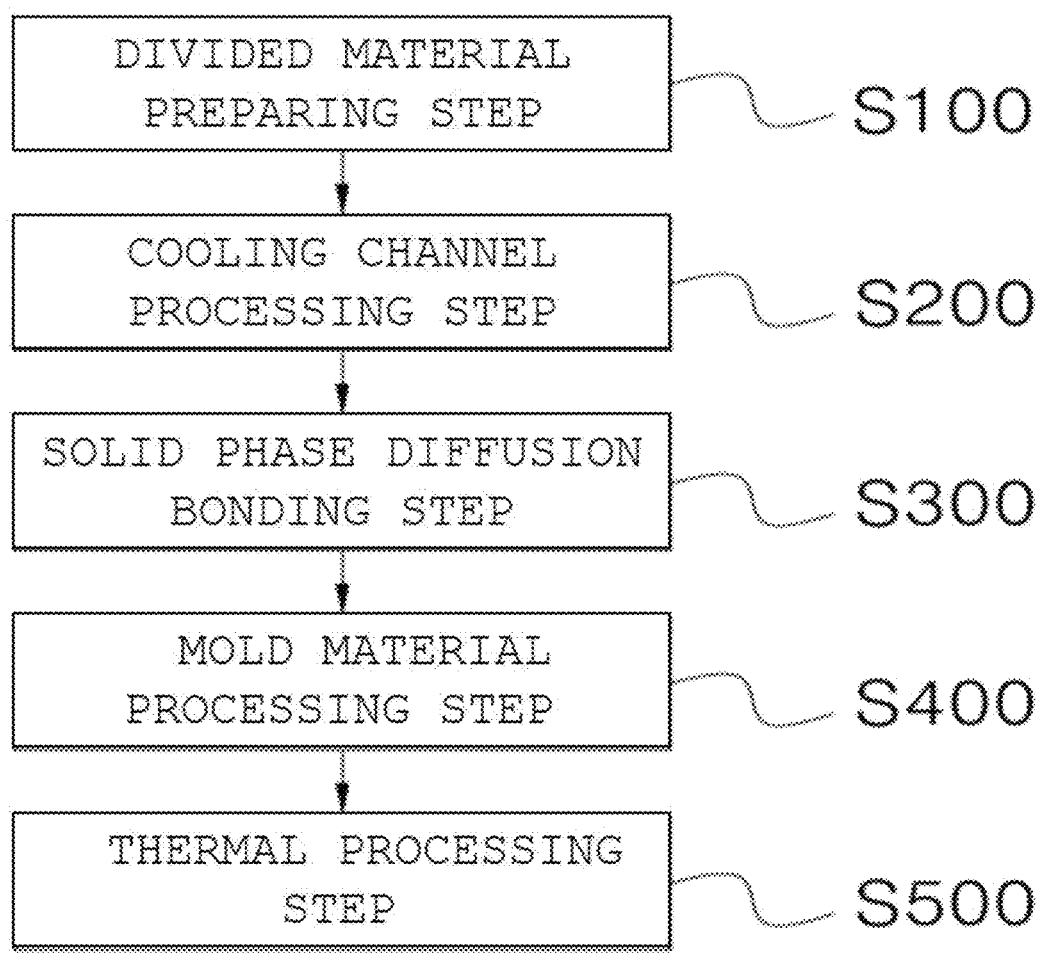
FIG. 1 is a flowchart illustrating a manufacturing method of a hot forming mold of a center pillar including a cooling unit according to a first exemplary embodiment of the present disclosure.

The present disclosure will be described more fully hereinafter with reference to the accompanying drawings, in which exemplary embodiments of the disclosure are shown so that the present disclosure may be easily implemented by those skilled in the art. However, the present disclosure can be realized in various different forms, and is not limited to the exemplary embodiments described herein. Further, in order to clearly disclose the present disclosure, parts which are not related to the present disclosure are omitted and in the drawings, like reference numerals denote like components.

Objects and effects of the present disclosure may be naturally understood or more clearly understood by the following description but the objects and the effects of the present disclosure are not limited only by the following description.

The objects, features, and advantageous of the present disclosure will become more apparent trough the following detailed description. In the following description, a detailed explanation of known related functions and constitutions may be omitted so as to avoid unnecessarily obscuring the subject matter of the present disclosure. Hereinafter, an exemplary embodiment according to the present disclosure will be described in detail with reference to the accompanying drawings.

Referring to FIG. 1, a manufacturing method of a hot forming mold of a center pillar including a cooling unit according to a first exemplary embodiment of the present disclosure may include a divided material 20 preparing step S100, a cooling channel 100 processing step S200, a solid phase diffusion bonding step S300, a mold material 40 processing step S400, and a thermal processing step S500. Each step will be described in more detail with reference to the drawings.

<1—Divided Material Preparing Step (S100)>

Figure 2:
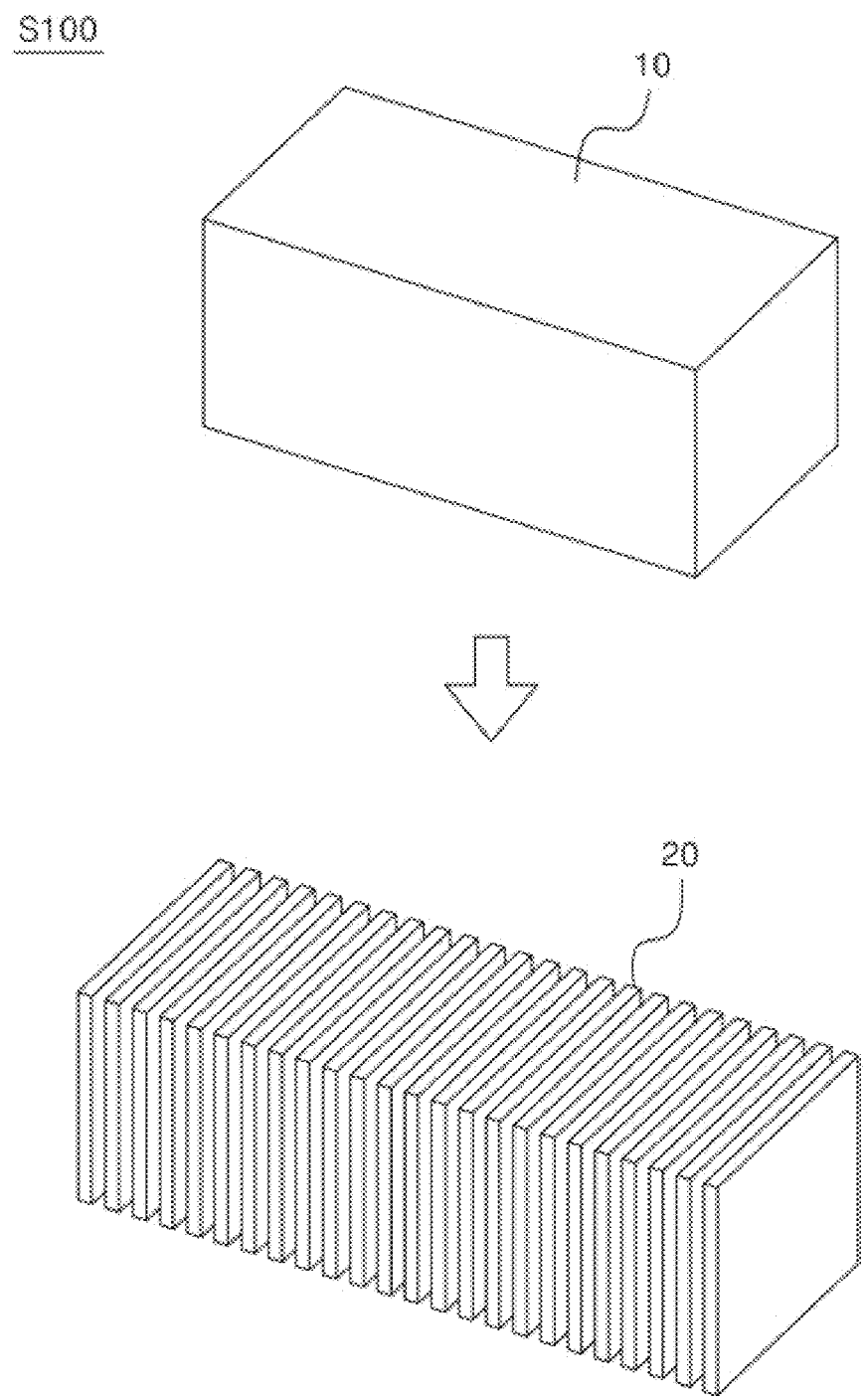
FIG. 2 is a view illustrating a divided material preparing step of a manufacturing method of a hot forming mold of a center pillar including a cooling unit according to a first exemplary embodiment of the present disclosure.

Referring to FIGS. 1 and 2, a divided material 20 preparing step is a step of cutting a metal material 10 which is a rectangular parallelepiped with a predetermined size to have a predetermined thickness to prepare a plurality of divided materials 20. The thickness of the divided material 20 may vary depending on a shape of a pre-designed center pillar and a shape/number of necessary cooling channels 100.

<2—Cooling Channel Processing Step (S200)>

Figure 3:
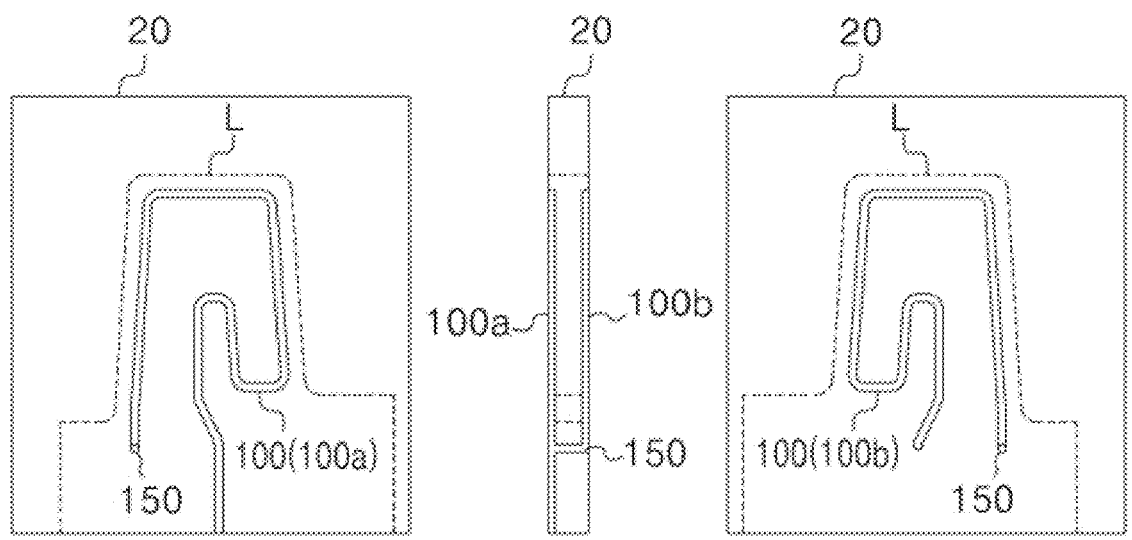
FIG. 3 is a view illustrating a cooling channel processing step of a manufacturing method of a hot forming mold of a center pillar including a cooling unit according to a first exemplary embodiment of the present disclosure.

Referring to FIG. 3, the cooling channel 100 processing step is a step of forming a cooling channel 100 on a front surface and a rear surface of the plurality of divided materials 20 which is divided into quadrangular plates. To be more specific, the cooling channels 100 are processed respectively on the front surface and the rear surface within a contour line L by center pillar design information which is input in advance to an NC processor and cooling channel 100 design information. The center pillar design information is design information about a contour line L and the cooling channel 100 design information is design information about a cooling channel 100 formed in a section within the contour line L.

In the cooling channel 100 processing step, on divided materials 20 located at both ends among the plurality of divided materials 20, only one of a front cooling channel 100*a* and a rear cooling channel 100 is processed and on each of the remaining divided materials 20 other than the edge divided materials 20, a front cooling channel 100*a* is processed on a front surface and a rear cooling channel 100*b* is processed on a rear surface.

In the cooling channel 100 processing step, with respect to one divided material 20, the front cooling channel 100*a* of one divided material 20 is processed to be symmetrical to have the same shape as the rear cooling channel 100*b* of the divided material 20 which is in contact therewith at the front side and the rear cooling channel 100*b* of the one divided material is processed to be symmetrical to have the same shape as the front cooling channel 100*a* of the divided material which is in contact therewith at the rear side. As described above, when the cooling channels 100 are symmetrically processed, if the materials are combined as an integrated material 30 by a subsequent process, the outlines of the cooling channels 100 match to each other so that the water tightness is increased, which increases cooling efficiency.

Further, the cooling channel 100 processing step may further include a through-hole 150 processing step. The through hole 150 is a configuration which connects the front cooling channel 100*a* and the rear cooling channel 100*b* and may be located/implemented in various forms by pre-designed cooling channel 100 design information. In addition to the through hole 150, a supply line through which cooling water is supplied to the cooling channel 100 from the outside and a discharge line through which cooling water is discharged may also be designed in various forms by the cooling channel 100 design information in consideration of the cooling efficiency, like the through hole 150.

<3—Solid Phase Diffusion Bonding Step (S300)>

Figure 4A:
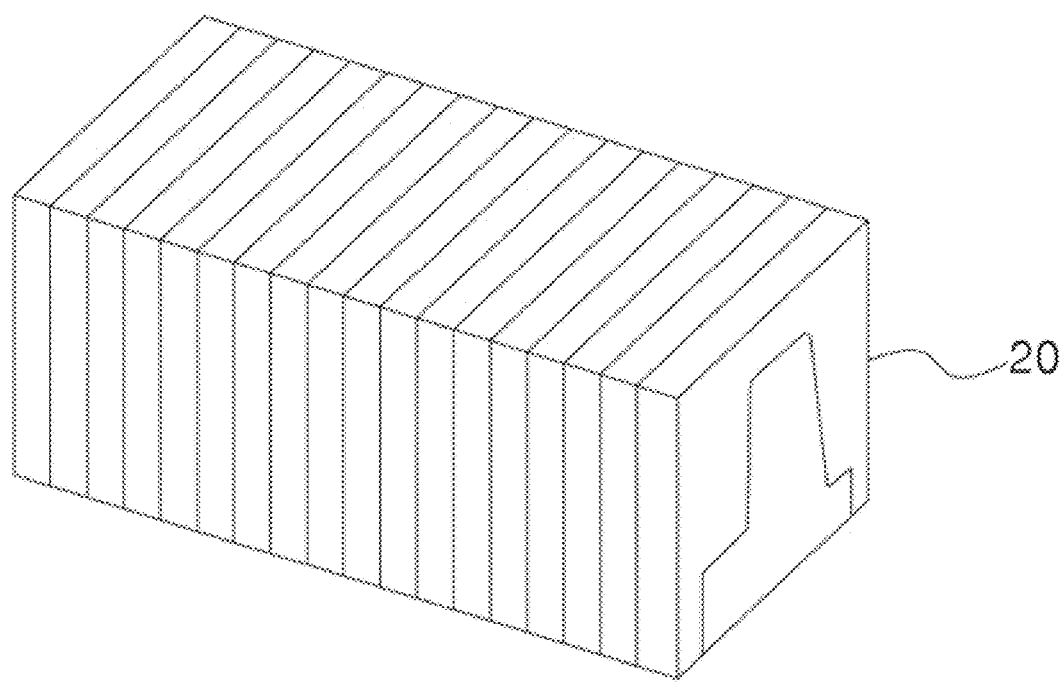
FIGS. 4A, 4B, and 4C are views illustrating a solid phase diffusion bonding step of a manufacturing method of a hot forming mold of a center pillar including a cooling unit according to a first exemplary embodiment of the present disclosure.
Figure 4B:
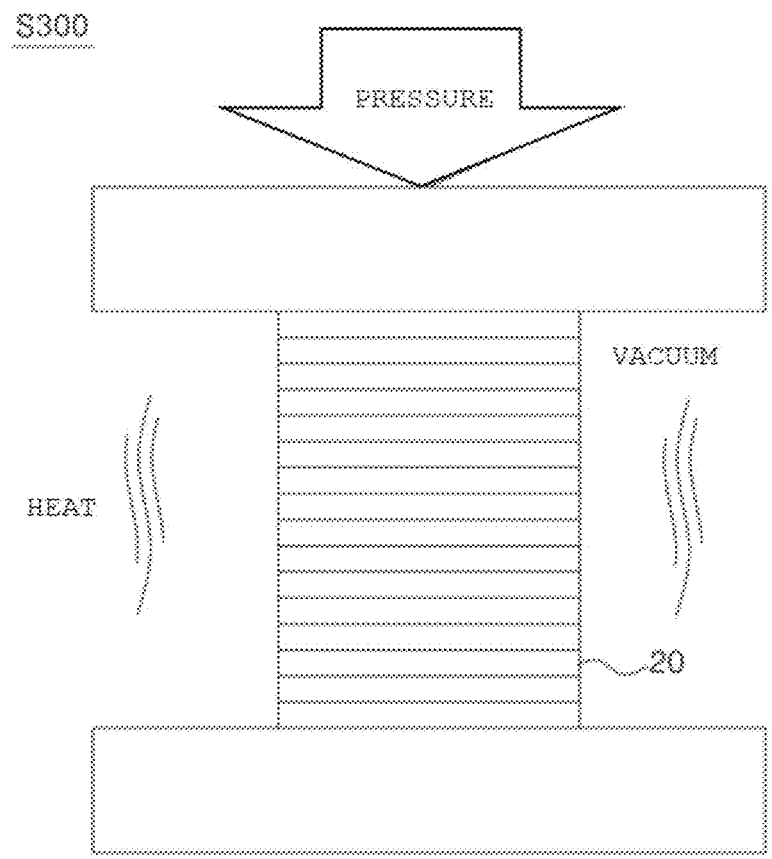
Figure 4C:
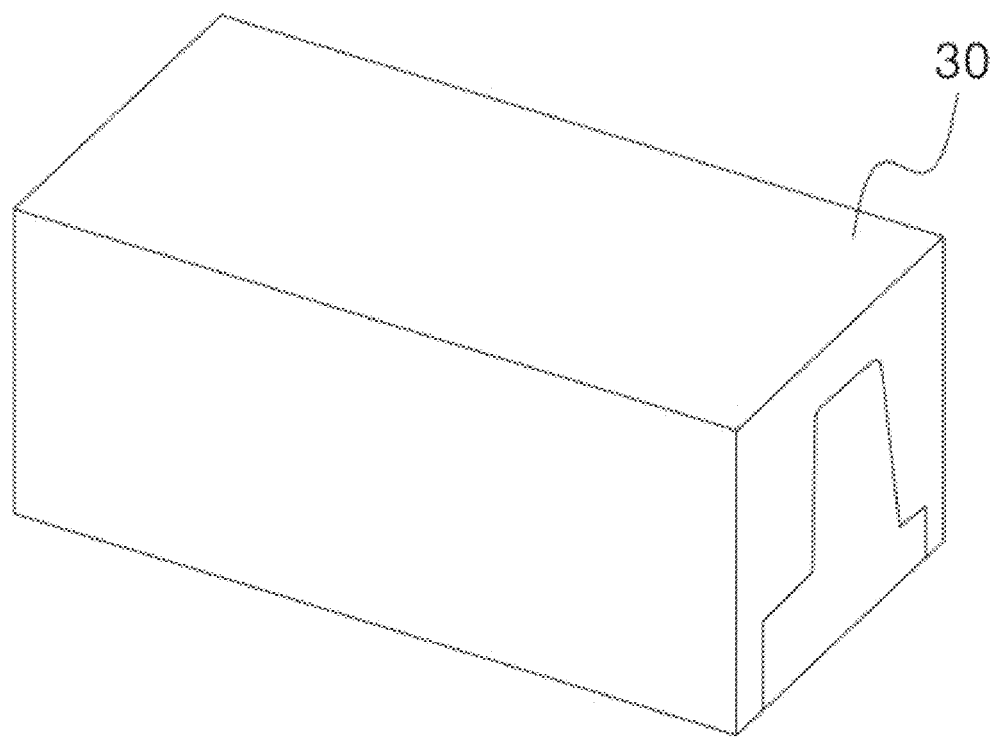

Referring to FIGS. 4A, 4B, and 4C, the solid phase diffusion bonding step is a step of sequentially positioning the plurality of divided materials 20 such that the cooling channels 100 abut with each other and then performing solid phase diffusion bonding thereon to form an integrated material 30.

The solid phase diffusion bonding step is a step of forming an integrated material 30 by pressurizing the plurality of divided materials 20 at a required temperature (1000° C. to 1100° C.) for a predetermined time by a predetermined pressure to form a single body.

The solid phase diffusion bonding is a method of pressurizing at a temperature below a melting point and a pressure to minimize plastic deformation to move and diffuse atoms. To be more specific, the solid phase diffusion bonding refers to a method of applying heat and a pressure to the same type or different types of materials within an elastic deformation range and bonding the materials in a solid phase using diffusion of atoms generated on a bonded surface. This method has a characteristic in that diffusion phenomenon of the atoms in a vacuum is used so that there is no defect such as solidification cracks and pores and a physical property equivalent to a base material can be ensured, and bonding with a material having a different property is also allowed.

By doing this, when the plurality of divided materials 20 is solid-phase diffusion bonded, the plurality of divided materials 20 may form a rectangular parallelepiped integrated material 30 which is integrated as one body by the diffusion of the atoms as a solid-phase single body, by the plastic deformation.

That is, the solid-phase diffusion bonded rectangular parallelepiped integrated material 30 has an outer surface having a shape of a body which is not processed at all, like the rectangular parallelepiped material which is initially prepared in the material preparing step, but a plurality of cooling channels 100 and through holes 150 is formed therein.

<4—Mold Material Processing Step (S400)>

Figure 5:
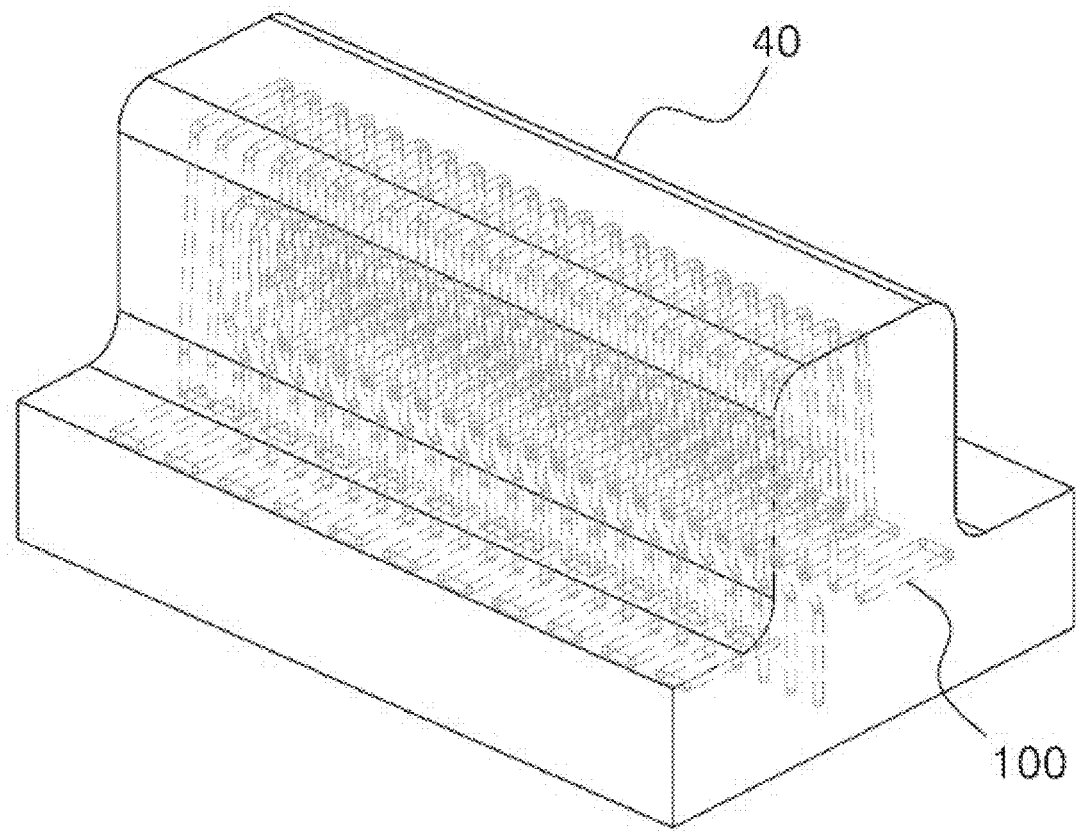
FIG. 5 is a view illustrating a mold material which is subjected to a mold material processing step of a manufacturing method of a hot forming mold of a center pillar including a cooling unit according to a first exemplary embodiment of the present disclosure.

Referring to FIG. 5, a mold material 40 processing step is a step of processing a mold material 40 by processing the integrated material 30 along the contour line L by center pillar design information which is input in advance through the NC processor. Through such a process, a forming surface having a three-dimensional effect is processed to have a curved shape and the mold material 40 in which cooling channels 100 are provided along the contour line L with a regular interval in the forming surface may be obtained.

<5—Thermal Processing Step (S500)>

The thermal processing step is a process of heating the mold material 40 at a predetermined temperature (1000° C. to 1100° C.) for a predetermined time to be thermally processed so that the mold material 40 may have a higher rigidity by performing the thermal processing. As an additional example, for more precise processing prior to the thermal processing step, additional processing is further performed on the mold material 40 with a regular dimension and then the finishing is performed by the thermal processing.

Figure 6:
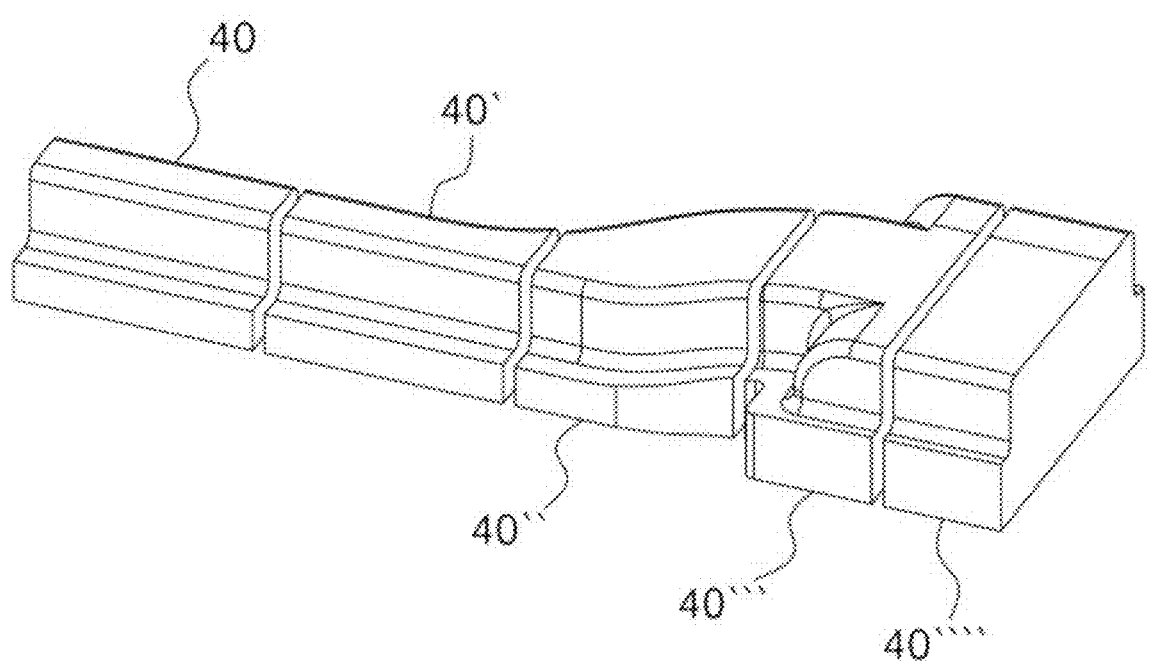
FIG. 6 is a view illustrating that a plurality of mold materials manufactured by a manufacturing method of a hot forming mold of a center pillar including a cooling unit according to a first exemplary embodiment of the present disclosure forms one set to be used as a final mold for manufacturing a center pillar.

A single mold material which is manufactured by the above-described processes is used alone or as illustrated in FIG. 6, a plurality of mold materials may be used as one set.

Figure 7:
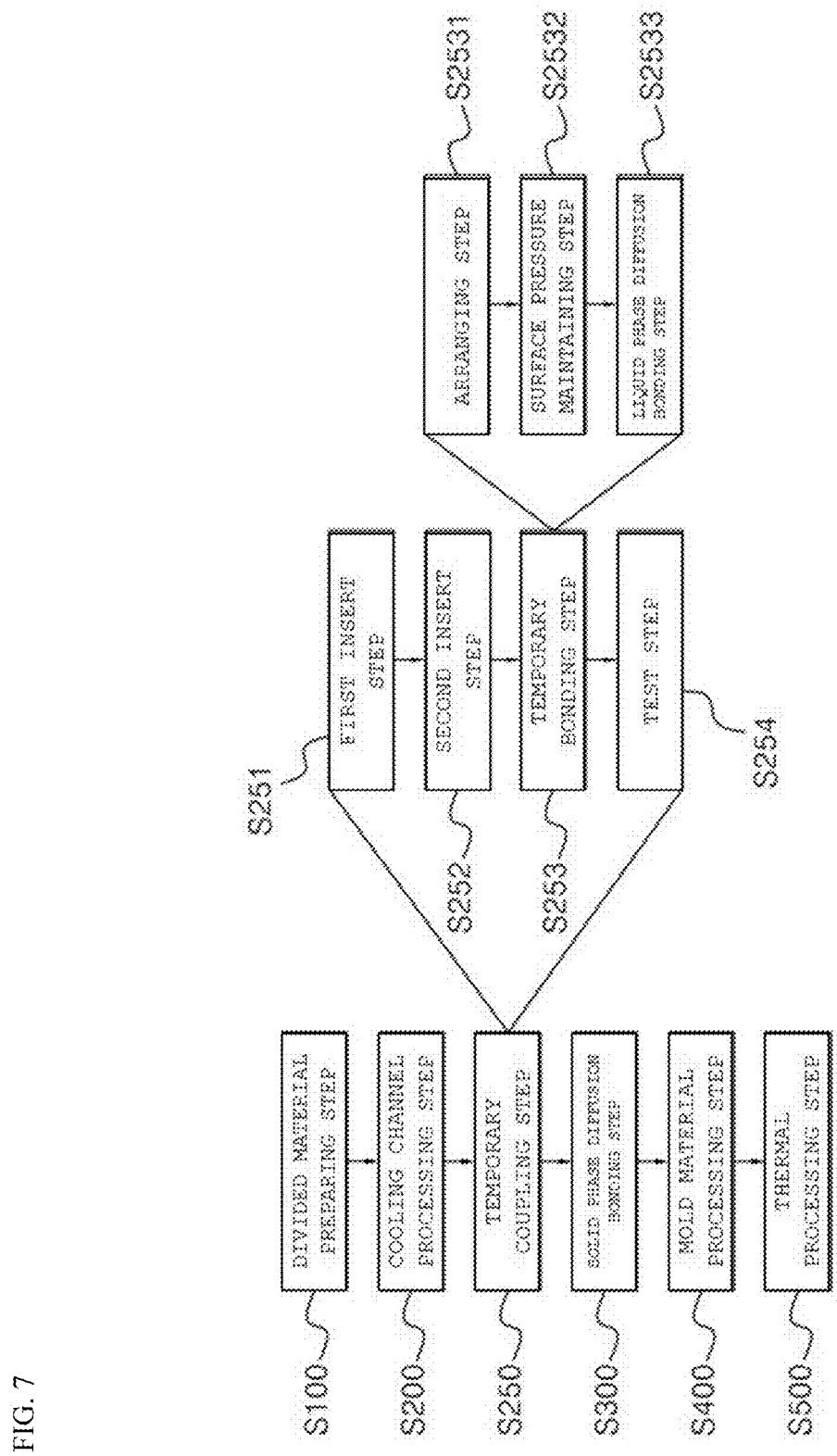
FIG. 7 is a flowchart illustrating a sequence of a manufacturing method of a hot forming mold of a center pillar including a cooling unit according to a second exemplary embodiment of the present disclosure.

Referring to FIG. 7, a manufacturing method of a hot forming mold of a center pillar including a cooling unit according to a second exemplary embodiment of the present disclosure may further include a temporary bonding step and a test step in addition to the manufacturing method of a hot forming mold of a center pillar including a cooling unit according to a second exemplary embodiment.

To be more specific, the manufacturing method of a hot forming mold of a center pillar including a cooling unit according to a second exemplary embodiment includes a divided material 20 preparing step, a cooling channel 100 processing step, a solid phase diffusion bonding step, a mold material 40 processing step, and a thermal processing step and further include a temporary coupling step and a test step between the cooling channel 100 processing step and the solid phase diffusion bonding step.

<1—Divided Material Preparing Step (S100)>

This step is the same as the divided material 20 preparing step (S100) of the first exemplary embodiment.

<2—Cooling Channel Processing Step (S200)>

This step is the same as the cooling channel 100 processing step (S200) of the first exemplary embodiment.

<3 Temporary Coupling Step (S250)>

Figure 8:
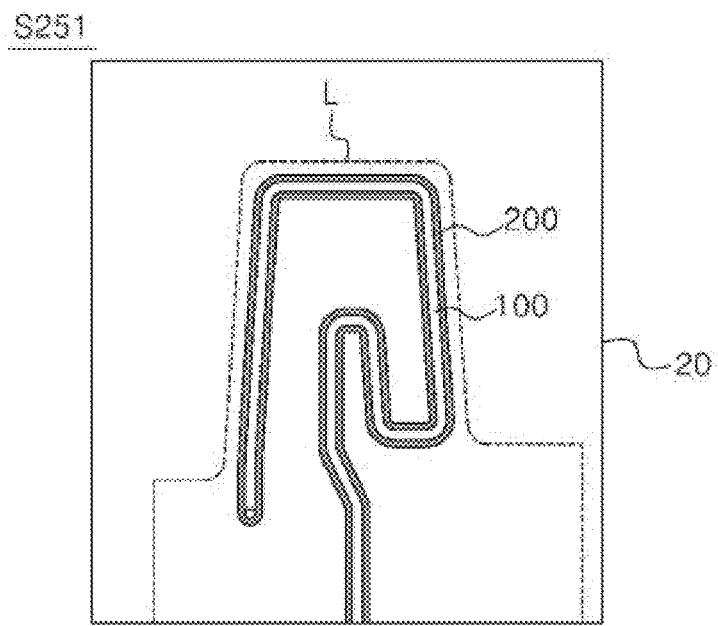
FIG. 8 is a view illustrating a first insert step and a second insert step of a manufacturing method of a hot forming mold of a center pillar including a cooling unit according to a second exemplary embodiment of the present disclosure.
Figure 8:
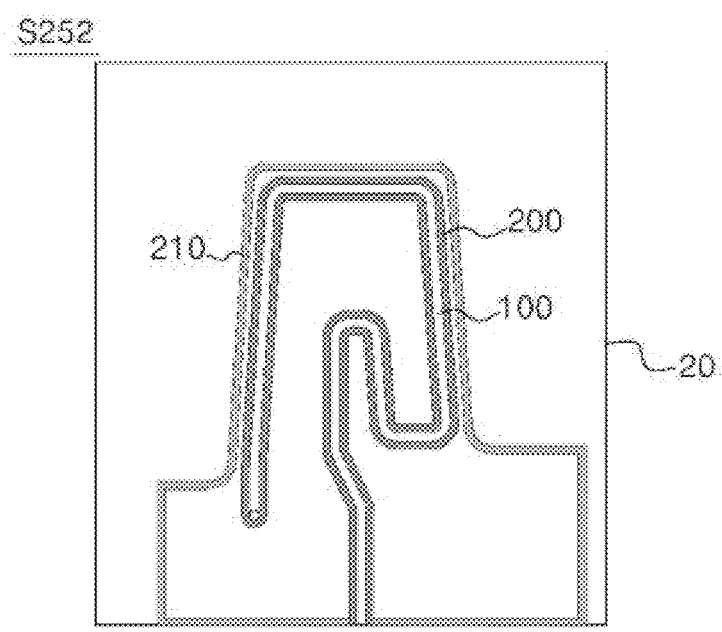

Referring to FIG. 8, after the cooling channel 100 processing step of the first exemplary embodiment, a temporary coupling step is added. The temporary coupling step includes a first insert step, a second insert step, a liquid phase diffusion bonding step, and a test step. Here, an insert material is a metal material having a melting point lower than a melting point of a divided material 20 which is a base material and includes at least one of B, Si, and P which are melting point dropping elements.

<3-1 First Insert Step (S251)>

Referring to FIG. 8, the first insert step is a step of interposing an insert material (first insert material) along an outline of the cooling channel 100 formed in the cooling channel 100 processing step. In the first insert step, the insert material is formed to be connected along the outline of the cooling channel 100 like packing.

<3-2 Second Insert Step (S252)>

Referring to FIG. 8, the second insert step is a step of interposing an insert material (second insert material) along the contour line L in the contour line L. In the second insert step, the insert material is formed to be connected along the contour line L, like packing. Here, each insert material has a melting material which is lower than melting point of the divided material 20 which is a material to be bonded.

<3-3 Temporary Bonding Step (S253)>

Figure 9:
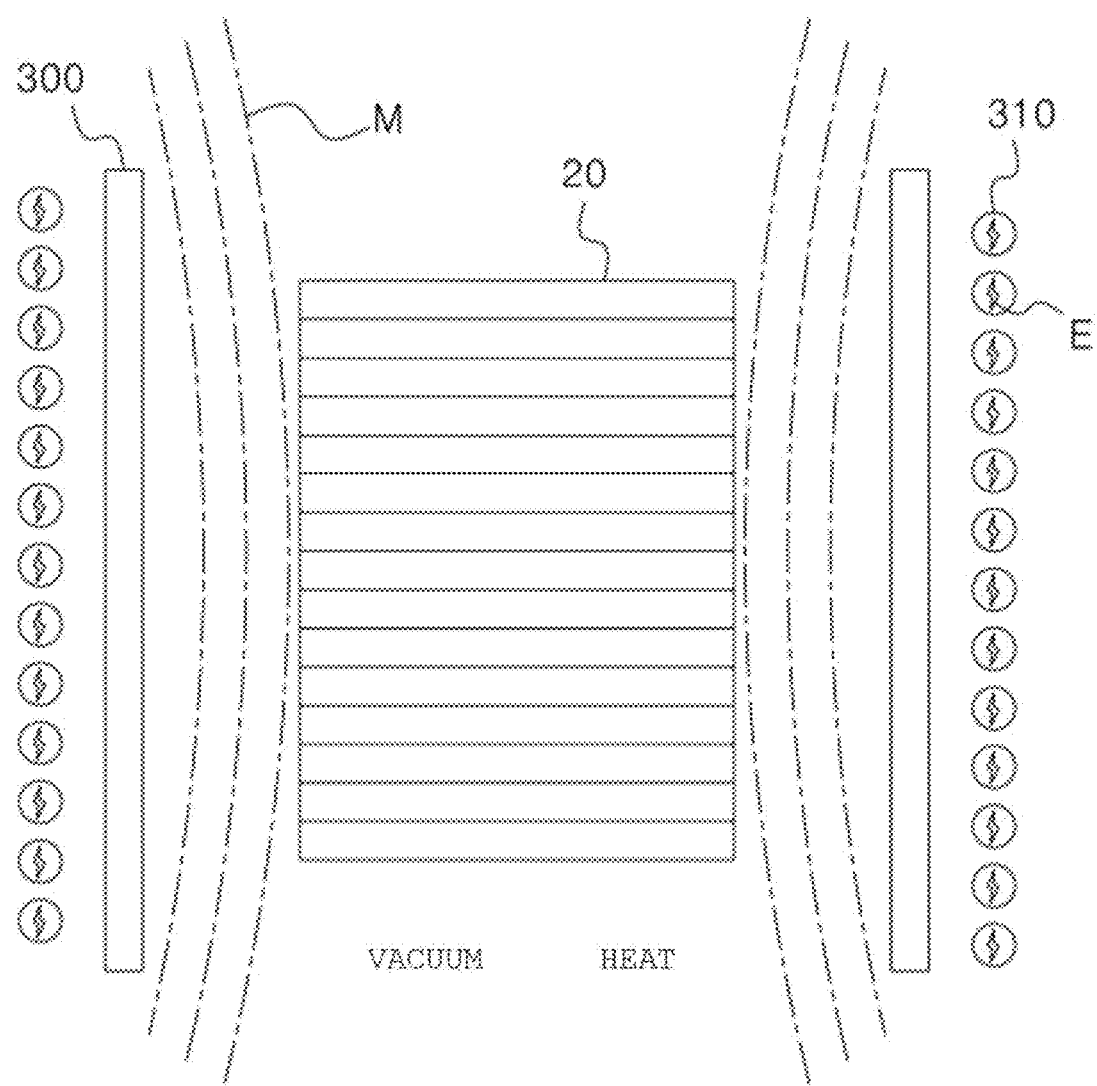
FIG. 9 is a view illustrating a temporary bonding step of a manufacturing method of a hot forming mold of a center pillar including a cooling unit according to a second exemplary embodiment of the present disclosure.

Referring to FIG. 9, the temporary bonding step is a step of temporarily bonding the divided materials 20 by melting the insert material interposed between the divided materials 20. In this step, after sequentially arranging the plurality of divided materials 20 such that the cooling channels 100 abut with each other, the insert material is melted and heated at a temperature at which the divided material 20 is not melted to be temporarily bonded, while maintaining a surface pressure of the bonded surface including the divided material 20 and the insert material. According to the liquid phase diffusion bonding, the insert material is temporarily formed to be a liquid phase on a bonding interface and is isothermal solidificated at the bonding temperature so that a bonding joint having a physical, chemical, and mechanical properties substantially the same as the base material which is the divided material 20 may be obtained. The liquid phase diffusion bonding step may be classified into a melting process of an insert material, a melting process of a divided material 20 by the insert material, an extinction process of the molten liquid phase, and a uniformizing process of a component element.

The 3-3 temporary bonding step may be configured by an arrangement step, a surface pressure maintaining step, and a liquid phase diffusion bonding step in detail as follows.

<3-3-1 Arranging Step (S2531)>

Referring to FIG. 9, the arranging step is a step of sequentially arranging the plurality of divided materials 20 such that the cooling channels 100 abut with each other. In the arranging step, the insert material needs to be correctly located between the divided materials 20.

<3-3-2 Surface Pressure Maintaining Step (S2532)>

Referring to FIG. 9, in the surface pressure maintaining step, the arranged divided materials 20 are located inside a guide unit 300 which is formed of a conductive material and has a pipe shape. Next, a spiral coil unit 310 which is formed of a conductive material is located to enclose an outer circumferential direction of the guide unit 300. Next, a current E is applied to the coil unit 310 to generate an induced current M. The divided materials 20 and the insert material are magnetized by the generated induced current M and attraction acts on the components having magnetic force by the magnetic force to apply a predetermined surface pressure to bonded surfaces of the divided material 20 and the insert material.

<3-3-3 Liquid Phase Diffusion Bonding Step (S2533)>

Referring to FIG. 9, the liquid phase diffusion bonding step is a step of melting the insert material interposed between the divided materials 20 by heating the divided material 20 which maintains the surface pressure at a predetermined melting temperature. At this time, the insert material is desirably melted in a vacuum state and according to the liquid phase diffusion bonding, the insert material is temporarily formed to have a liquid phase on a bonding interface and is isothermal solidificated at the bonding temperature so that a bonding joint having a physical, chemical, and mechanical properties substantially the same as the base material which is the divided material 20 may be obtained. The liquid phase diffusion bonding step may be classified into a melting process of an insert material, a melting process of a divided material 20 by the insert material, an extinction process of the molten liquid phase, and a uniformizing process of a component element.

<3-4 Test Step (S254)>

The test step is a step of examining the contour line L of the temporarily bonded divided material 20 and the cooling channel 100 by ultrasound scanning to screen defective liquid phase diffusion bonding. The contour line L and the outline of the cooling channel 100 are temporarily bonded in the liquid phase diffusion bonding step so that the contour line and the outline are examined to screen the defect and when there is a defectively bonded part, it is used as source data to adjust a direction or a magnitude of a pressure applied in the subsequent solid phase diffusion step. However, the test step may be omitted if necessary. If a skill level of an operator who performs the liquid phase diffusion bonding step is high so that a defect rate is low, the solid phase diffusion bonding step may be performed on the temporarily bonded divided material 20 as it is.

<4 Solid Phase Diffusion Bonding Step (S300)>

This step is the same as the solid phase diffusion bonding step of the first exemplary embodiment but is a process of press-fitting by adjusting a magnitude or a direction of a pressure to be applied based on the data tested in the test step S254 and solid-phase diffusion bonding the remaining parts which are not coupled in the temporary coupling step.

<5-Mold Material Processing Step (S400)>

This step is the same as the mold material 40 processing step of the first exemplary embodiment.

<6-Thermal Processing Step (S500)>

This step is the same as the thermal processing step of the first exemplary embodiment.

Referring to FIGS. 10, 11, 12, and 13, a manufacturing method of a hot forming mold of a center pillar including a cooling unit according to a third exemplary embodiment of the present disclosure may be added to the manufacturing method of a forming mold according to the first exemplary embodiment and the manufacturing method of a forming mold according to the second exemplary embodiment and is a process of specifying a cooling channel 100 processing step.

Figure 10:
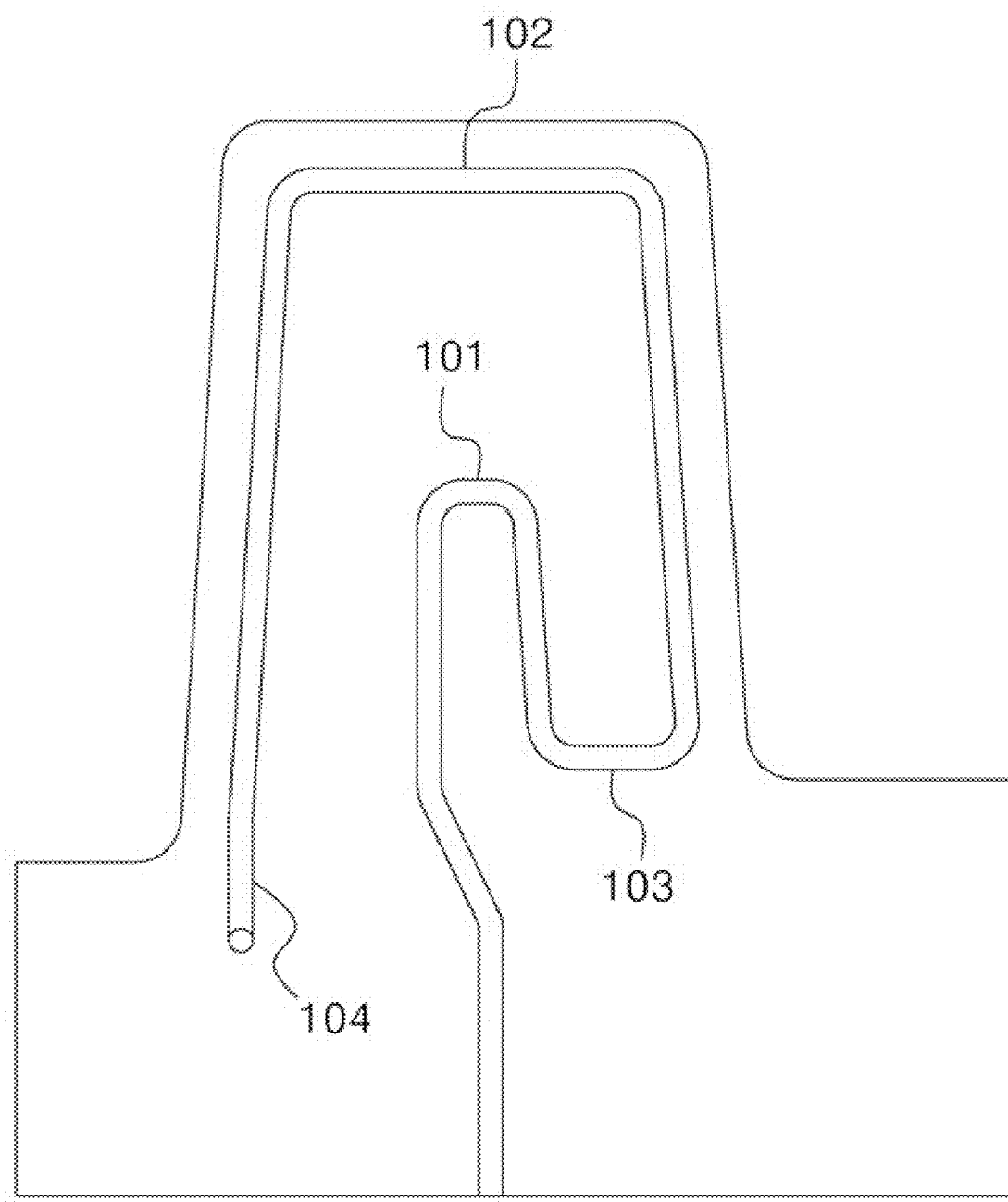
FIG. 10 is a view illustrating a cooling channel of a manufacturing method of a hot forming mold of a center pillar including a cooling unit according to a third exemplary embodiment of the present disclosure.

Referring to FIG. 10, a cooling channel 100 of the manufacturing method of the hot forming mold of the center pillar including a cooling unit according to the third exemplary embodiment may include a first cooling section 101 formed in an inner center direction of the contour line L, a second cooling section 102 formed along the contour line L, a bridge section 103 connecting the first cooling section and the second cooling section 102, and a finishing section 104 formed at an end of the second cooling section 102.

As described above, the cooling channel 100 is desirable to allow a cooling water flowing along the cooling channel 100 to sequentially pass through the first cooling section 101, the bridge section 103, the second cooling section 102, and the finishing section 104.

<A—Hydraulic Control Unit Forming Step>

Figure 11:
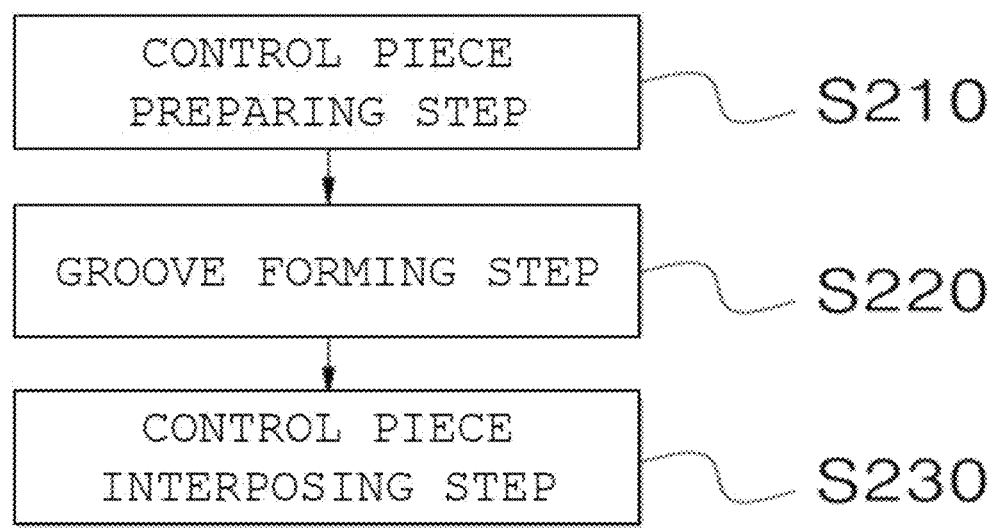
FIG. 11 is a flowchart illustrating a hydraulic control unit forming step of a manufacturing method of a hot forming mold of a center pillar including a cooling unit according to a third exemplary embodiment of the present disclosure.

Referring to FIG. 11, the hydraulic control unit 400 forming step is a process of forming a hydraulic control unit 400 only in the bridge section 103 or the finishing section 104, or both in the bridge section 103 and the finishing section 104 and the hydraulic control unit 400 is a component which controls a pressure of the cooling water flowing along the cooling channel 100 to increase the cooling efficiency.

At this time, the cooling channel 100 corresponding to the first cooling section 101 and the second cooling section 102 is processed to have a semicircular cross-section so that divided materials 20 which are opposite to each other are combined to have a circular cross-section. Further, the cooling channel 100 corresponding to the bridge section 103 and the finishing section 104 is processed to have a rectangular cross-section so that divided materials 20 are combined to have a quadrangular cross-section. At this time, the rectangular cross-section size is set in consideration of a flow rate in the section having a circular cross-section so that a flow rate of a cooling water in the section having a rectangular cross-section is equal to a flow rate in the section having a circular cross-section. The cross-section is formed to have a quadrangular shape to prevent a control piece from being bonded to the divided material 20 after a control piece installing process to be described below.

The hydraulic control unit 400 forming step may include a control piece 410 preparing step, a control groove 420 forming step, and a control piece 410 interposing step.

<A1—Control Piece Preparing Step (S210)>

Figure 12:
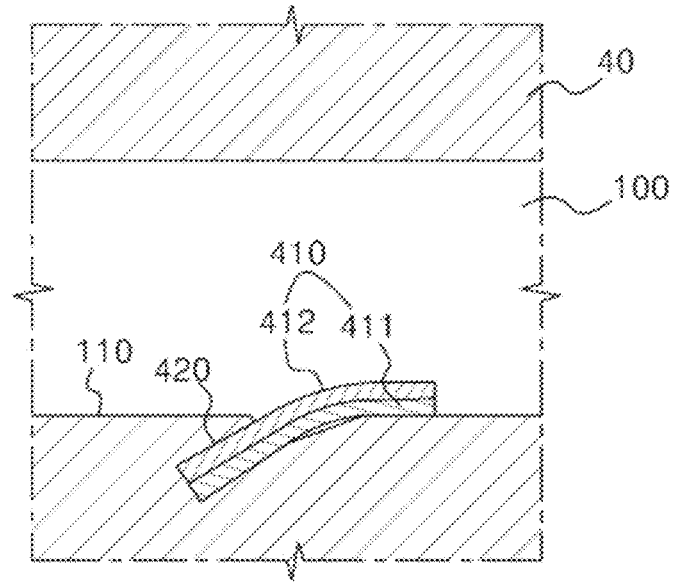
FIGS. 12 and 13 are views illustrating a hydraulic control unit of a manufacturing method of a hot forming mold of a center pillar including a cooling unit according to a third exemplary embodiment of the present disclosure.
Figure 12:
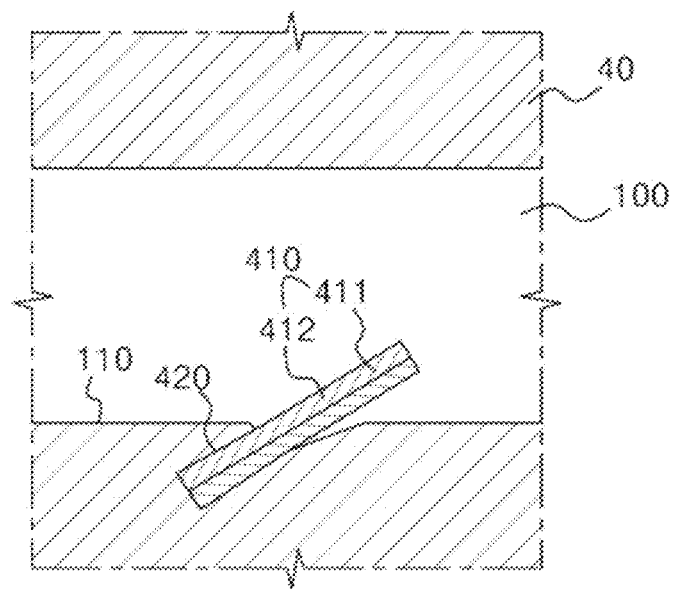

Referring to FIGS. 11 and 12, the control piece 410 preparing step is a step of bonding a first piece 411 and a second piece 412 which are provided as quadrangular metal material plates and have different thermal expansion coefficients. To be more specific, the control piece 410 preparing step is a step of bonding the first piece 411 having one thermal expansion coefficient and the second piece 412 having a thermal expansion coefficient which is lower than that of the first piece 411. To be more specific, the control piece 410 may be formed to be thicker toward the end of the control groove 420 so as not to deviate from the control groove 420 when the control piece is inserted into the control groove 420 to be described below. Further, even though it is described that the control piece 410 is provided to have a plate shape, a portion inserted into the control groove 420 has a linear plate shape, but a portion outwardly protruding from the control groove 420 may be formed to be bent toward a wall surface 110 on which the control groove 420 is formed.

<A2—Control Groove Forming Step (S220)>

Referring to FIGS. 11 and 12, the control groove 420 forming step is a step of forming a control groove 420 into which the control piece 410 is interposed on the wall surface 110 of the cooling channel 100 processed to have a rectangular shape of the bridge section 103 and the finishing section 104. To be more specific, the control groove 420 into which the control piece 410 is inserted toward the rectangular wall surface 110 of the cooling channel 100 is formed to form the control groove 420 in a direction forming an acute angle with the wall surface 110 of the cooling channel 100. Further, the control groove 420 may be formed in the same context as the control piece 410 such that a width of the control groove 420 increases toward the end in a depth direction of the control groove 420 so as to prevent the control piece 410 from deviating.

<A3—Control Piece Interposing Step (S230)>

Referring to FIGS. 11 and 12, the control piece 410 interposing step is a step of inserting a part of the control piece 410 into the control groove 420 to locate and interpose the first piece 411 to be directed to the wall surface 110 and the second piece 412 to be directed to the cooling channel 100. Further, when the control piece 410 is interposed, a carbon sheet is formed on a circumferential surface of the control piece 410 which is inserted into the control groove 420 so as to prevent the control piece 410 from being bonded with the divided material 20 during a subsequent diffusion bonding process. In this case, the carbon sheet blocks/absorbs the heat during the diffusion binding process so that the control piece 410 is not bonded with the divided material 20.

Figure 13:
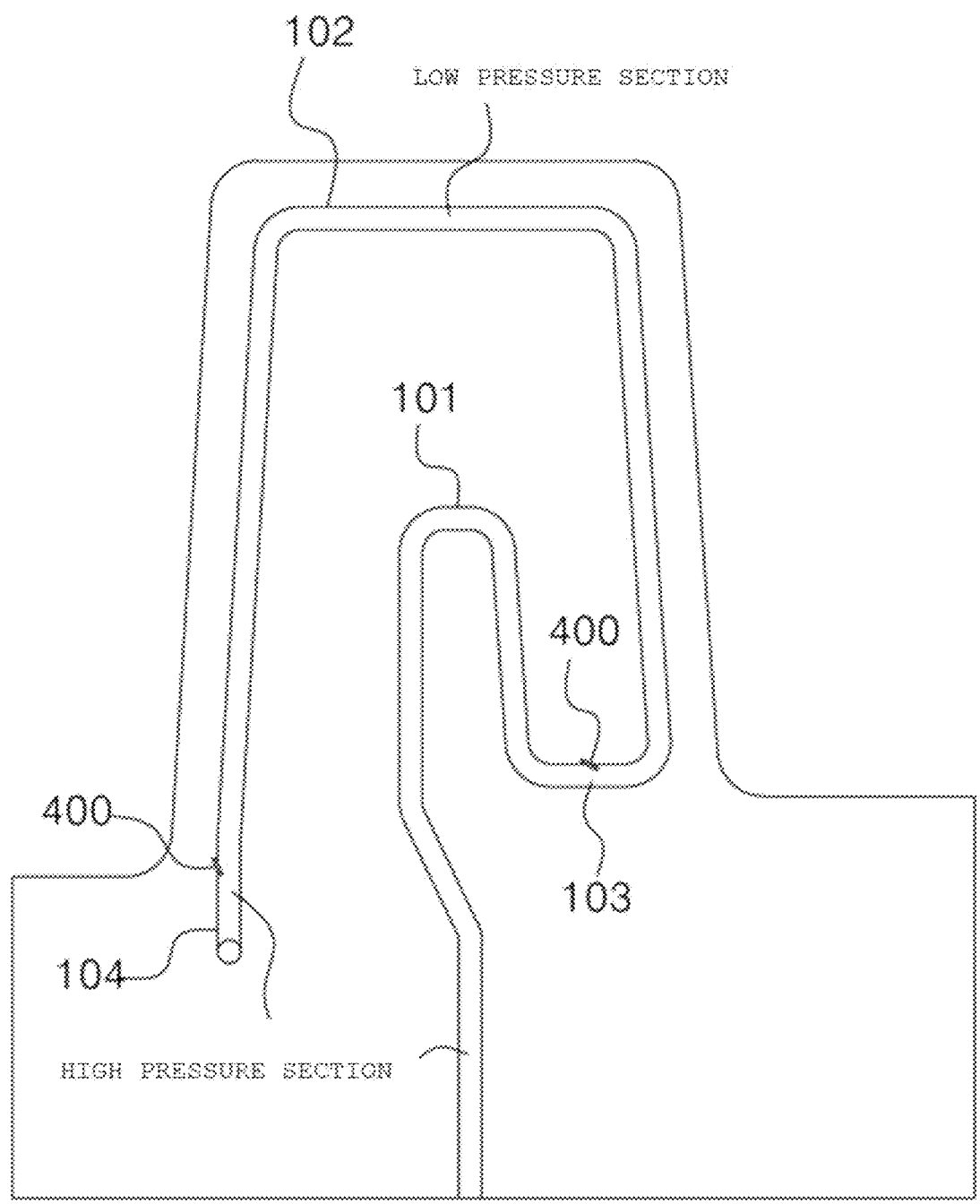

Referring to FIGS. 12 and 13, as described above, when the hydraulic control unit 400 forming step is performed, if the temperature of the mold material 40 is high, the control piece 410 is bent toward the cooling channel 100 due to different thermal expansion coefficients of the first piece 411 and the second piece 412. At this time, the passage of the cooling channel 100 is narrowed due to the bent control piece 410 so that the pressure of the cooling water which passes through the corresponding section is increased and after passing through the corresponding section, the pressure of the cooling water is lowered. Accordingly, the cooling efficiency may be improved in the second cooling section in which phase change due to the cooling water with a reduced pressure is caused or the molecular density is lowered. In the meantime, in the cooling channel 100 in the section where the hydraulic control unit 400 is formed, a normal cooling water may be used or a refrigerant which may cause a phase change by the temperature change may also be used.

Further, during the molding task or after completing the molding task, the control piece 410 is positioned to its original position due to the lowered temperature (room temperature) to return the pressure of the cooling channel 100 to be uniformized.

When the control piece 410 is formed as described above, the control piece 410 varies to increase a cooling efficiency of the second cooling section 102 at a time when rapid cooling is required, and the pressure of the second cooling section 102 is returned at a time when the cooling is completed so that a high efficient cooling system which may minimize a stress to be applied to the cooling channel 100 may be used.

Figure 14:
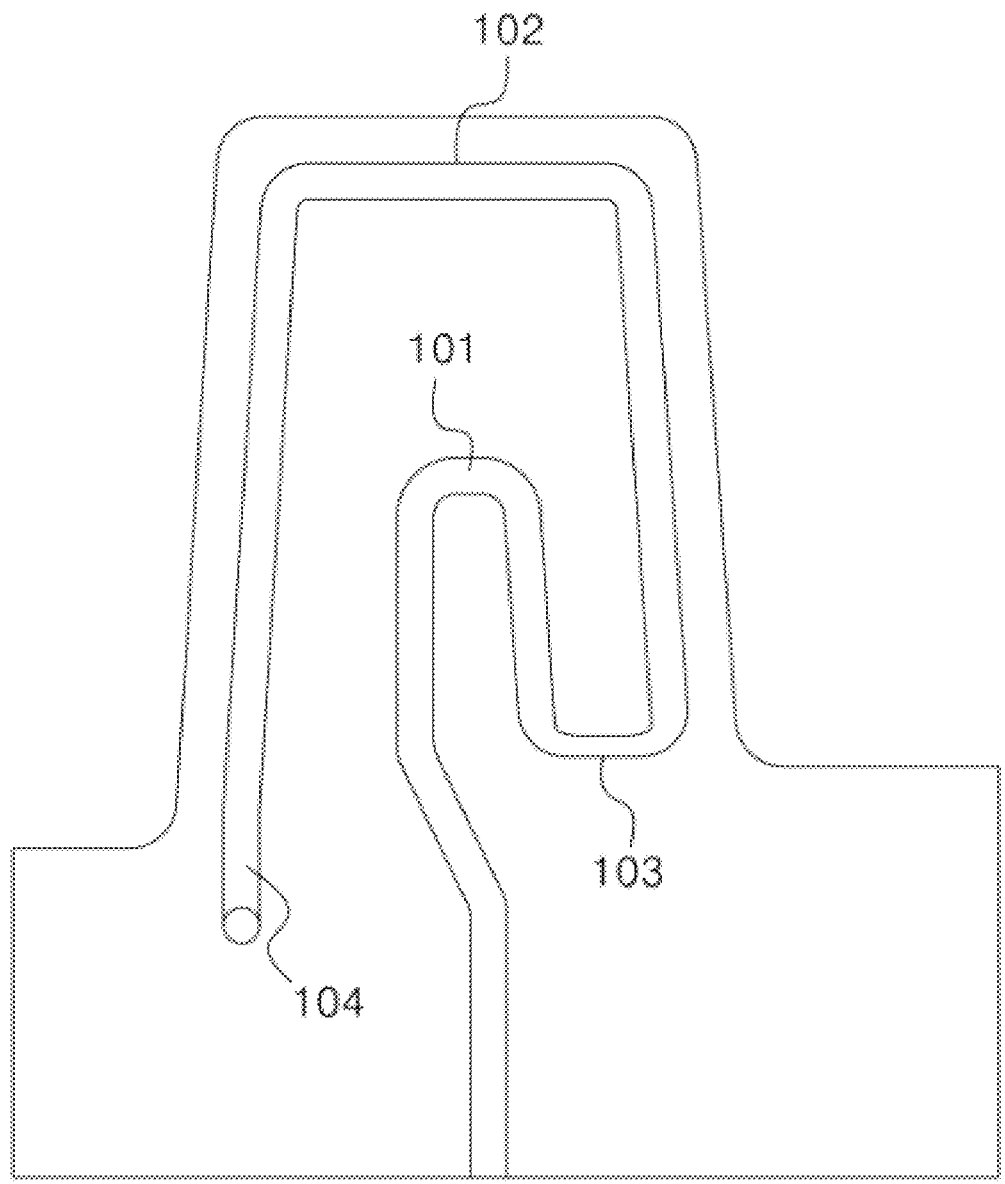
FIGS. 14 and 15 are views illustrating a cooling channel of a manufacturing method of a hot forming mold of a center pillar including a cooling unit according to a fourth exemplary embodiment of the present disclosure.
Figure 15:
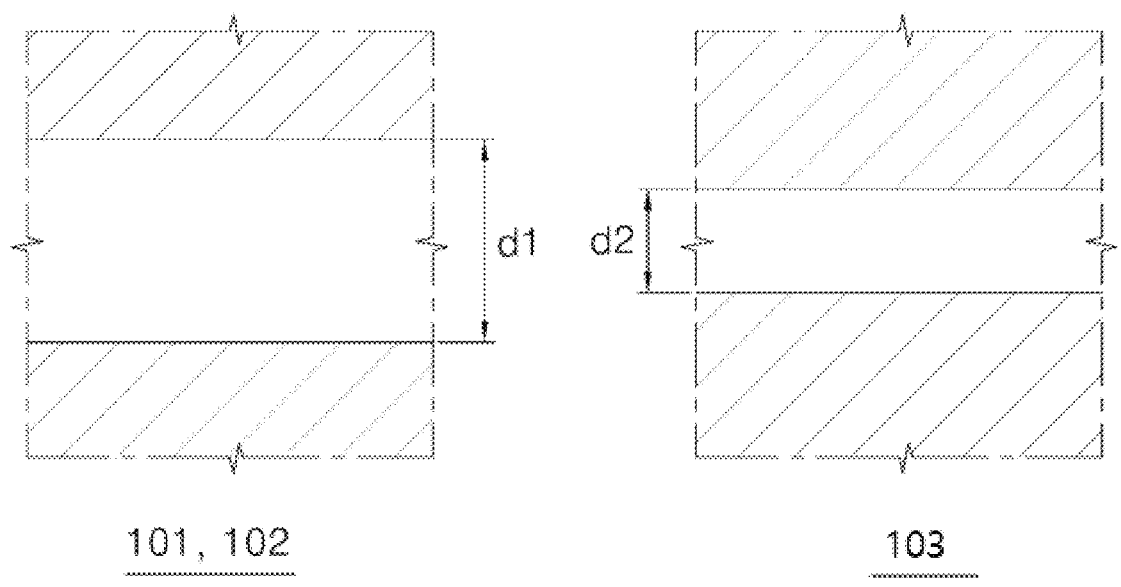
Figure 16:
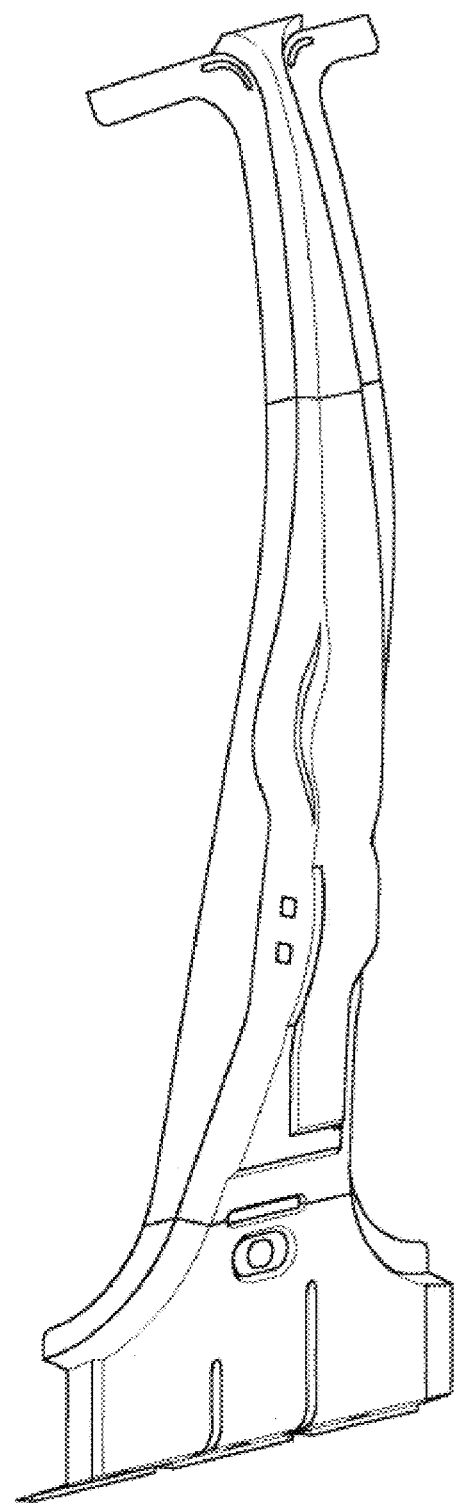
FIG. 16 is a view illustrating a center pillar which is manufactured by a manufacturing method of a hot forming mold of a center pillar including a cooling unit according to the present disclosure as an example.

In the meantime, referring to FIGS. 14 and 15, a cooling channel of the manufacturing method of the hot forming mold of the center pillar including a cooling unit according to a fourth exemplary embodiment specifies the processing of the cooling channel 100 in the cooling channel processing step S200 according to the first exemplary embodiment or the second exemplary embodiment and may include a first cooling section 101 formed in an inner center direction of the contour line L, a second cooling section 102 formed along the contour line L, a bridge section 103 connecting the first cooling section and the second cooling section 102, and a finishing section 104 formed at an end of the second cooling section 102.

As described above, the cooling channel 100 is desirable to allow a cooling water flowing along the cooling channel 100 to sequentially pass through the first cooling section 101, the bridge section 103, the second cooling section 102, and the finishing section 104.

In the meantime, in the cooling channel 100 according to the fourth exemplary embodiment, a width (diameter) of the cooling channels may vary in each cooling channel to control a movement speed of the cooling water which passes through the corresponding section. With this configuration, in a section which requires intensive cooling, the cooling water moving speed is relatively lowered and in the section which relatively does not require the intensive cooling, the cooling water moving speed is relatively increased.

To be more specific, the first cooling section 101 and the second cooling section 102 which require relatively slow cooling water movement and high cooling efficiency are processed to have a predetermined first diameter d1 (size) and the bridge section 103 which requires relatively fast cooling water movement may be processed to have a second diameter d2 which is relatively smaller than the first diameter d1.

In the meantime, when the cooling channel is designed or processed as described above, the cooling water which passes through the first cooling section 101 and the second cooling section 102 which require relatively intensive cooling has a higher flow rate per section with the same length as compared with the bridge section 103 and the corresponding section passing speed is relatively slower than that of the bridge section 103. Therefore, sufficient heat exchange may be allowed.

In the meantime, in the bridge section 103, the cooling water (and/or refrigerant) may have a relatively fast velocity of flow due to the narrow width of the cooling channel so that the cooling water quickly passes through the corresponding section so that unnecessary heat exchange with the surrounding is minimized so that unnecessary increase of the cooling water temperature may be prevented.

Moreover, the time when the cooling water passes through the cooling channel is entirely shortened so that the product productivity per unit time is increased in accordance with the shortened process time so that improvement of the process economics may be expected.

In the meantime, one mold material 40 manufactured according to the above-described exemplary embodiment may be solely used and in the case of the center pillar having a relatively long length, as illustrated in FIG. 6, a plurality of mold materials may be used as one set.

While the preferred exemplary embodiments of the present disclosure have been described for illustrative purposes, it should be understood by those skilled in the art that various changes, modifications, and additions may be made without departing from the spirit and scope of the present disclosure as defined in the appended claims. Various substitutions, modifications, and changes can be made within the scope without departing from the technical spirit of the present disclosure by those skilled in the art, and as a result, the present disclosure is not limited to the aforementioned embodiments and the accompanying drawings. In the above-described exemplary system, although the methods have been described based on a flowchart as a series of steps or blocks, the present disclosure is not limited to the order of the steps and some steps may be generated in a different order from the above-described step or simultaneously. Further, those skilled in the art may appreciate that the steps shown in the flowchart is not exclusive, but another step may be included and one or more steps of the flowchart may be omitted without affecting the scope of the present disclosure.

What is claimed is:

1. A manufacturing method of a hot forming mold including a cooling unit, the manufacturing method comprising:
   a step of preparing a material by cutting a metal material to have a predetermined thickness to be divided into a plurality of divided materials;
   a cooling channel processing step of processing cooling channels on a front surface and a rear surface within a contour line L by mold design information which is input in advance to an NC processor and cooling channel design information, on a surface on which the plurality of divided materials is overlaid;
   a first insert step of interposing a first insert material along an outline of the cooling channel;
   a second insert step of interposing a second insert material in the contour line L along the contour line L;
   a temporary bonding step of heating the first insert material and the second insert material at a temperature at which the first insert material and the second insert material are melted to perform liquid phase diffusion bonding while maintaining a surface pressure of a bonded surface including the divided material and the first insert material and the second insert material after sequentially arranging the plurality of divided materials such that the cooling channels abut;

a step of testing the contour line L of the divided material which is temporarily bonded and the cooling channel by ultrasound scanning;

a solid phase diffusion bonding step of performing solid phase diffusion bonding after sequentially locating the plurality of divided materials such that the cooling channels abut to form an integrated material;

a mold material processing step of processing the integrated material along the contour line L by the mold design information which is input in advance through the NC processor to manufacture a mold material; and a thermal processing step of heating the mold material at a predetermined temperature, wherein the divided material which is temporarily bonded in the liquid phase diffusion boding is formed as an integrated material in the solid phase diffusion bonding step.

2. The manufacturing method according to claim 1, wherein in the cooling channel processing step, a front cooling channel is symmetrical to a rear cooling channel.

3. The manufacturing method according to claim 2, further comprising:

a through hole which connects the front cooling channel and the rear cooling channel.

4. The manufacturing method according to claim 1, wherein the temporary bonding step includes:

a step of sequentially arranging the plurality of divided materials such that the cooling channels abut;

a surface pressure maintaining step of locating the located divided materials in a guide unit which is formed of a conductive material and has a pipe shape, locating a spiral coil unit which is formed of a conductive material and is located to enclose an outer circumferential direction of the guide unit, generating an induced current M by applying current E to the coil unit to magnetize the arranged divided materials to apply a predetermined surface pressure to the bonded surface of the divided material and the first insert material and the second insert material; and a liquid phase diffusion bonding step of heating the first insert material and the second insert material in a vacuum state at a temperature at which the first insert material and the second insert material are melted to perform the liquid phase diffusion bonding.

5. The manufacturing method according to claim 2, wherein the cooling channel includes:

a first cooling section which is formed in an inner center direction of the contour line L;

a second cooling section formed along the contour line L;

a bridge section which connects the first cooling section and the second cooling section; and a finishing section formed at an end of the second cooling section, and a cooling water flowing along the cooling channel sequentially passes through the first cooling section, the bridge section, the second cooling section, and the finishing section.

6. The manufacturing method according to claim 5, wherein the cooling channel processing step further includes:

a step of processing the cooling channel corresponding to the first cooling section and the second cooling section to have a semicircular cross-section, the cooling channel corresponding to the bridge section and the finishing section to have a rectangular cross-section, and forming a hydraulic control unit in each of the bridge section and the finishing section, the hydraulic control unit forming step includes:

a step of preparing a control piece in which a first piece which is provided to have a rectangular plate shape and has one thermal expansion coefficient and a second piece having a thermal expansion coefficient lower than that of the first piece are bonded;

a step of forming a control groove into which the control piece is inserted toward a wall surface of the cooling channel such that the control groove is formed in a direction forming an acute angle with the wall surface of the cooling channel; and a step of inserting a part of the control piece into the control groove such that the first piece is directed to the wall surface and the second piece is directed to the cooling channel, when a temperature of the mold material is high, the control piece is bent toward the cooling channel due to different thermal expansion coefficients of the first piece and the second piece and when the temperature of the mold material is low, the control piece returns to its original position, and when the mold material is at a high temperature, a pressure of the cooling water in the second cooling section is lowered due to the control piece.

7. The manufacturing method according to claim 6, wherein in the step of inserting a part of the control piece into the control groove such that the first piece is directed to the wall surface and the second piece is directed to the cooling channel, a carbon sheet is formed on a circumferential surface of the control piece which is inserted into the control groove to prevent the diffusion bonding of the control piece.

8. The manufacturing method according to claim 5, wherein the first cooling section and the second cooling section are processed to have a predetermined first diameter $d1$ and the bridge section is processed to have a second diameter $d2$ which is relatively smaller than the first diameter $d1$ so that a speed of the cooling water which passes through a section having the second diameter $d2$ is relatively faster than a speed of the cooling water which passes through a section having the first diameter $d1$.

* * * * *